March 14, 1944.　　　　C. E. TACK　　　　2,343,940
BRAKE ARRANGEMENT
Filed May 26, 1941　　　2 Sheets-Sheet 1
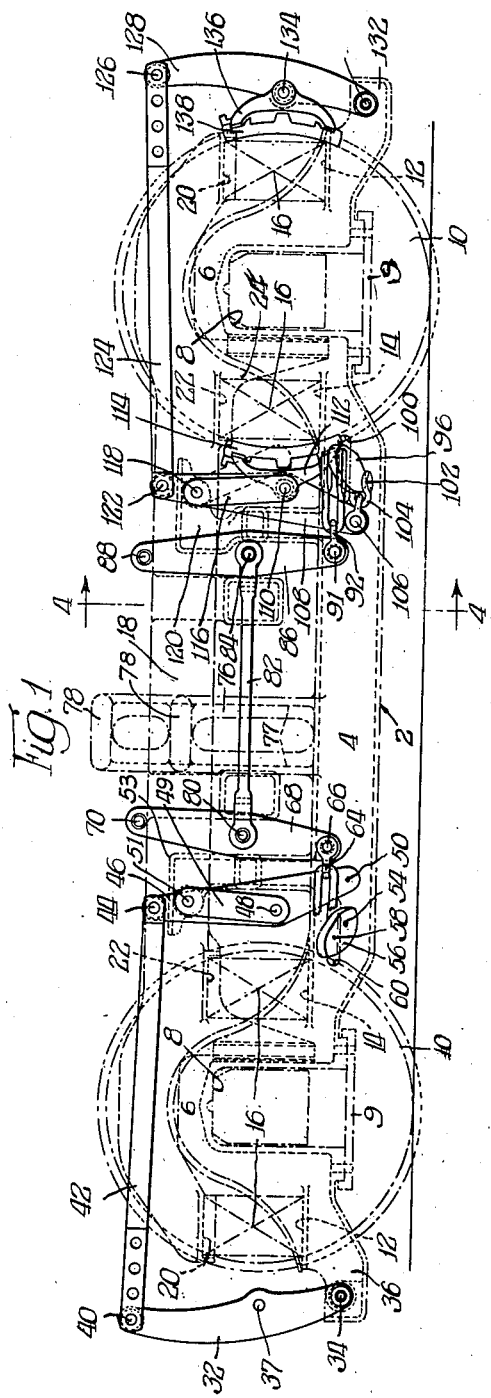
INVENTOR.
Carl E. Tack.
BY
ATTY.

March 14, 1944.　　　C. E. TACK　　　2,343,940
BRAKE ARRANGEMENT
Filed May 26, 1941　　　2 Sheets-Sheet 2
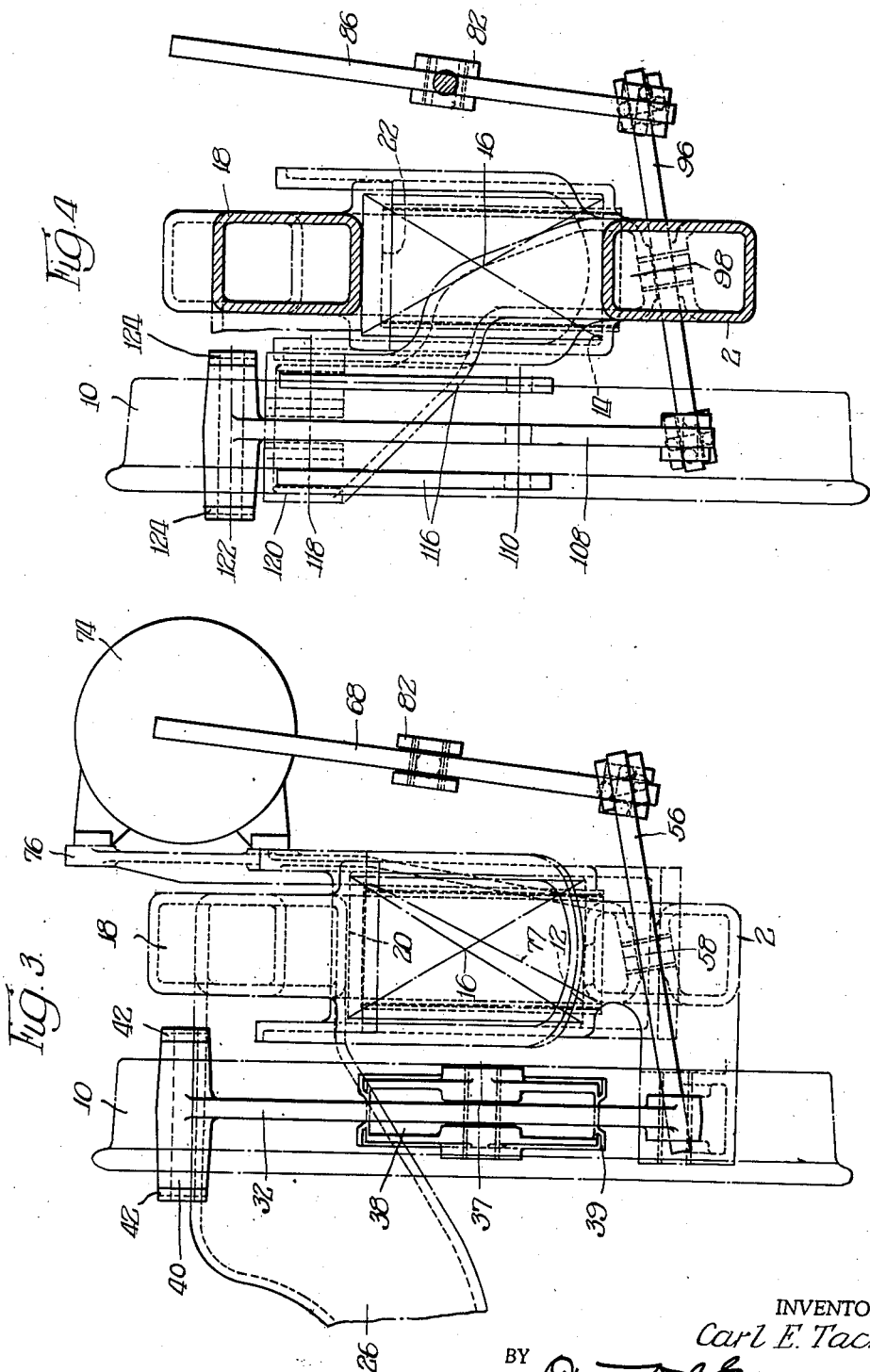

Patented Mar. 14, 1944

2,343,940

UNITED STATES PATENT OFFICE 2,343,940

BRAKE ARRANGEMENT

Carl E. Tack, Chicago, Ill., assignor to American Steel Foundries, Chicago, Ill., a corporation of New Jersey Application May 26, 1941, Serial No. 395,131

34 Claims. (Cl. 188—56)

My invention relates to a brake arrangement of the unit cylinder clasp type wherein power means for actuation of the brake rigging is mounted on the truck frame, and brake heads and brake shoes are supported at opposite sides of each wheel for braking engagement with the periphery thereof.

A general object of my invention is to devise such a brake arrangement suitable for application to a novel form of car truck comprising upper and lower side frame members and wherein dead levers may be supported from the lower side frame member at the extremities thereof, live levers supported intermediate the wheels, and power means mounted on the lower side frame member adjacent the transverse center line of the truck for actuation of the brake rigging.

My novel brake arrangement comprehends the use of approximately vertical live and dead cylinder levers connected intermediate their ends to each other and at their upper ends to the respective ends of said power means and at their lower ends to transversely arranged substantially horizontal truck levers, said truck levers being fulcrumed in the lowermost of said side frame members and positioned below the axle level.

My novel truck arrangement utilizes a lower side frame member with pedestal jaws for connection in the usual manner to associated wheel and axle assemblies, said lower frame member having spring seats at opposite sides of each pedestal opening on which may seat coil springs for support of the top side frame member, said top side frame member being afforded pedestals bearing against adjacent sides of the pedestal openings at opposite ends of the frame. My novel brake arrangement is adapted to afford suitable braking at each side of such a novel form of car truck, the brake arrangement at opposite sides of the truck being generally similar but actuated independently of each other and by separate power means.

A different object of my invention is to devise a suitable clasp brake arrangement of unit cylinder type for such a car truck as that described wherein the lower side frame member will afford means for fulcruming vertical dead levers at the extremities of the frame and means for fulcruming horizontal brake levers intermediate the wheels at each side of the truck.

In the drawings,

Figure 1 is a side elevation of a four wheel railway car truck and brake arrangement embodying my invention.

Figure 2 is a top plan view of the truck and brake arrangement shown in Figure 1, only one side of the car truck being shown inasmuch as the structure is similar at opposite sides thereof as already mentioned; said top plan view having the right end of the top side frame member cut away in order to clarify the structure shown therebelow.

Figure 3 is an end elevation taken from the left of the truck and brake arrangement shown in Figures 1 and 2, and Figure 4 is a sectional view therethrough taken substantially in the transverse vertical plane indicated by the line 4—4 of Figure 1.

In each of the figures certain details are omitted when they are more clearly illustrated in other views.

It may be noted that my novel brake arrangement is applied to a car truck comprising composite side frames each having a bottom member generally designated 2, said bottom member being of general box-section comprising inboard and outboard walls and top and bottom transverse webs, said side member comprising a horizontal central portion 4 with elevated end portions 6, 6 each of which is formed with spaced pedestal jaws defining pedestal openings 8, 8 serving as the usual means of connection to journal ends (not shown) of the associated wheel and axle assemblies 10, 10. The bottom end of each pedestal opening 8 may be closed with the usual strap 9 extending thereacross. Each end portion 6 of the bottom side frame member is formed with a horizontal web adjacent the extremity thereof defining a spring seat 12, and on the opposite side of the adjacent pedestal opening a horizontal web defining a spring seat 14 on which may be positioned coil springs diagrammatically indicated at 16, 16. Said coil springs 16, 16 afford support for the top side frame member generally designated 18, said top side frame member 18 having horizontal webs aligned with the beforementioned webs of the bottom member to afford top spring seats 20, 20 at the extremities thereof and intermediate spring seats 22, 22. Each top member 18 is formed with a pedestal 24 adjacent each pedestal opening in order to facilitate proper alignment of the top and bottom side frame members.

With each top side frame member 18 may be integrally formed or otherwise secured thereto the usual spaced transoms 26 and 28, said transoms affording support for a swing bolster (not shown) which may be connected thereto as indicated at 30, 30 by means of swing hangers (not shown).

The brake arrangement at each side of the car track comprises the vertical dead lever 32 fulcrumed from its lower end as at 34 from the inturned bracket 36 integrally formed at the extremity of the bottom frame member 2, said lever 32 affording a pivotal connection as at 37 (Figure 3) for the brake head 38 and the brake shoe 39 arranged for braking engagement with the periphery of the adjacent wheel 10. The upper end of the dead truck lever 32 has a pivotal adjustable connection at 40 with the paired inboard and outboard straps 42, 42 which extend over the axle, and the opposite ends of said paired straps may have pivotal connection as at 44 to the upper end of the live truck lever 46. Intermediate the ends of the vertical live lever 46 may be pivotally supported as at 48 a brake head and a brake shoe (not shown) mounted for engagement with the opposite periphery of the last-mentioned wheel. Also may be connected at the pivotal point 48 the lower ends of the paired hangers 49, 49, the upper ends of said hangers being pivotally hung as at 51 from the bracket 53 integrally formed with the bottom frame member 2. The lower end of the live lever 46 may have a pivotal connection as at 50 to the clevis means 52, and the opposite end of said clevis means may have a pivotal and adjustable connection as at 54 to the substantially horizontally arranged transverse dead truck lever 56, said transverse truck lever being fulcrumed intermediate its ends as at 58 (Figure 3) in the slot 60 of the bottom frame member 2. The outboard end of the transverse dead lever 56 may have a pivotal connection as at 62 with one end of the clevis means 64, and the opposite end of said clevis means 64 may have a pivotal connection as at 66 with the vertical dead cylinder lever 68, the upper end of said dead cylinder lever having a pivotal and adjustable connection as at 70 with the automatic slack adjuster 72 which may be mounted on one end of the power means or brake cylinder 74. The brake cylinder 74 may be secured by any convenient means to the vertical bracket 76 which is integrally formed with the lower frame member 2, the juncture of said bracket with said member 2 being reinforced by the vertical webs or gussets 77, 77, the form of which may best be seen from consideration of the end view of Figure 3. Said bracket 76 may have at its upper end spaced cylinder pads 78, 78 affording a convenient seat for said power means 74. Intermediate the ends of the dead cylinder lever 68 may be pivotally connected as at 80 the pull rod 82, and the opposite end of said pull rod may have a pivotal connection as at 84 with the live cylinder lever 86, the upper end of which has a pivotal connection as at 88 to the piston 90 of the power means 74. The lower end of the live cylinder lever 86 may have a pivotal connection as at 91 to the clevis means 92, the opposite end of which is pivotally and adjustably connected as at 94 to the transverse dead truck lever 96 which is fulcrumed intermediate its ends as at 98 (Figure 4) in the slot 100 in the frame member 2. The inboard end of the dead lever 96 has a pivotal connection as at 102 to the clevis means 104 whose opposite end has pivotal connection as at 106 with the lower end of the live truck lever 108. Intermediate the ends of the live truck lever 108 may be pivotally connected as at 110 the brake head 112 and the brake shoe 114 arranged for braking engagement with the periphery of the adjacent wheel. Also at the pivotal point 110 may be connected the paired hangers 116, 116, the upper ends of which may be hung as at 118 from the bracket 120, said bracket being integrally formed with the bottom frame member 2 and extending upwardly therefrom. The upper end of the live lever 108 may have pivotal connection as at 122 to the paired inboard and outboard straps 124, 124 and the opposite ends of said straps may have pivotal and adjustable connection as at 126 to the upper end of the vertical dead lever 128, the lower end of which may be fulcrumed as at 130 from the inturned bracket 132 at the extremity of the lower frame member 2. Intermediate the ends of the dead lever 128 a pivotal connection may be afforded as at 134 for the brake head 136 and mounting the associated brake shoe 138 for braking engagement with the adjacent periphery of the last mentioned wheel.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement, a wheel and axle assembly and brake means therefor comprising a live and a dead truck lever, means connecting the tops of said levers, and power means operatively associated with the live lever.

2. In a brake arrangement for a railway car truck, a composite side frame comprising a bottom member with wheel connecting means at opposite ends thereof, spring seats at opposite sides of each wheel connecting means, springs thereon, a top frame member supported on said springs, supporting wheel and axle assemblies, braking means comprising dead truck levers fulcrumed at their lower ends from said bottom frame member, live truck levers supported from said bottom frame member intermediate the wheels, over-axle straps connecting the truck levers associated with each wheel and axle assembly, power means supported from said bottom frame member intermediate the wheels, and operative connections between each live truck lever and the adjacent end of said power means, said operative connections comprising transverse truck levers fulcrumed in said bottom frame member and connected respectively to said live truck levers, and operative connections between said truck levers and opposite ends of said power means.

3. In a brake arrangement for a railway car truck, a side frame having spaced pedestals, supporting wheel and axle assemblies, brackets on the extremities of said frame below the axle level, power means mounted on said side frame, and brake rigging comprising dead levers fulcrumed at their lower ends from said brackets, hangers supporting live truck levers intermediate the wheels, straps connecting the live and dead levers at each end of the truck, and operative connections between said power means and said live truck levers, said operative connections comprising transverse levers fulcrumed in said frame and connected at corresponding ends to said live truck levers respectively, interconnected live and dead cylinder levers connected at their upper ends to opposite ends of said power means and connected at their lower ends to said transverse levers respectively, one of the connections to said power means being automatically adjustable.

4. In a brake arrangement for a railway car truck, a composite side frame comprising a bottom member with wheel connecting means at opposite ends thereof, spring seats at opposite sides of each wheel connecting means, springs thereon, a top frame member supported on said springs, supporting wheel and axle assemblies, braking means comprising dead truck levers fulcrumed at their lower ends from said bottom frame member, live truck levers supported from said bottom frame member intermediate the wheels, over-axle straps connecting the truck levers associated with each wheel and axle assembly, power means supported from said bottom frame member intermediate the wheels, and operative connections between each live truck lever and the adjacent end of said power means, said operative connections comprising transverse truck levers fulcrumed in said bottom frame member and connected respectively to said live truck levers.

5. In a brake arrangement for a railway car truck, a side frame having spaced wheel connecting means, supporting wheel and axle assemblies, brackets on the extremities of said frame below the axle level, power means mounted on said side frame, brake rigging comprising dead levers fulcrumed at their lower ends from said brackets, hangers supporting live truck levers intermediate the wheels, straps connecting the live and dead levers at each end of the truck, and operative connections between said power means and said live truck levers, said operative connections comprising dead truck levers fulcrumed intermediate their ends in said frame, connected at their inner ends to said live truck levers respectively, and interconnected live and dead cylinder levers connected at their upper ends to opposite ends of said power means and at their lower ends to said truck levers respectively.

6. In a brake arrangement for a railway car truck, a side frame having spaced pedestals, supporting wheel and axle assemblies, brackets on the extremities of said frame below the axle level, power means mounted on said side frame, and brake rigging comprising dead levers fulcrumed at their lower ends from said brackets, live truck levers supported intermediate the wheels, straps connecting the live and dead levers at each end of the truck, and operative connections between said power means and said live truck levers, said operative connections comprising transverse levers fulcrumed in said frame and connected at their inner ends to said live truck levers respectively, interconnected live and dead cylinder levers connected at their upper ends to opposite ends of said power means and connected at their lower ends to said transverse levers respectively.

7. In a brake arrangement for a railway car truck, a side frame having spaced wheel connecting means, supporting wheel and axle assemblies, brackets on the extremities of said frame below the axle level, power means mounted on said side frame, and brake rigging comprising dead levers fulcrumed at their lower ends from said brackets, hangers supporting live truck levers intermediate the wheels, straps connecting the live and dead levers at each end of the truck, and operative connections between said power means and said live truck levers, said operative connections comprising dead truck levers fulcrumed in said frame and connected at corresponding ends to said live levers respectively, and live and dead cylinder levers connected at corresponding ends to said power means and at their opposite ends to said dead truck levers respectively.

8. In a brake arrangement for a railway car truck, a side frame having spaced wheel connecting means, supporting wheel and axle assemblies, brackets on the extremities of said frame below the axle level, power means mounted on said side frame, brake rigging comprising dead levers fulcrumed at their lower ends from said brackets, live truck levers supported intermediate the wheels, straps connecting the live and dead levers at each end of the truck, and operative connections between said power means and said live truck levers, said operative connections comprising transversely arranged levers fulcrumed in said frame at opposite sides of said power means and connected at their inner ends to said live levers respectively, and live and dead cylinder levers connected to said transversely arranged levers.

9. In a brake arrangement for a railway car truck, a side frame having spaced wheel connecting means, supporting wheel and axle assemblies, brackets on the extremities of said frame below the axle level, power means mounted on said side frame, and brake rigging comprising dead levers fulcrumed at their lower ends from said brackets, hangers supporting live truck levers intermediate the wheels, straps connecting the live and dead levers at each end of the truck, and operative connections between said power means and said live truck levers, said operative connections comprising dead truck levers fulcrumed intermediate their ends in said frame, connected at their inner ends to said live truck levers respectively and operatively connected at their outer ends to opposite ends of said power means.

10. In a brake arrangement for a railway car truck, a composite side frame comprising a bottom member with wheel connecting means at opposite ends thereof, spring seats at opposite sides of each wheel connecting means, springs thereon, a top frame member supported on said springs, means limiting relative longitudinal movement between said frame members, supporting wheel and axle assemblies, and braking means comprising dead truck levers fulcrumed at their lower ends from said bottom frame member, live truck levers supported from said bottom frame member intermediate the wheels, straps connecting the truck levers associated with each wheel and axle assembly, power means supported from said bottom frame member intermediate the wheels, and an operative connection between each live truck lever and the adjacent end of said power means.

11. In a brake arrangement, a vehicle frame, a supporting wheel and axle assembly and brake means therefor comprising a dead lever at one side of said assembly and fulcrumed at its lower end from said frame, a live lever at the opposite side of said assembly and connected at the upper end thereof to the upper end of said dead lever, and power means operatively associated with said lever.

12. In a brake arrangement for a railway car truck, a composite side frame comprising a bottom member with wheel connecting means at opposite ends thereof, spring seats at opposite sides of each wheel connecting means, springs thereon, a top frame member supported on said springs, supporting wheel and axle assemblies, braking means comprising dead truck levers fulcrumed at their lower ends from said bottom frame member, live truck levers supported from said bottom frame member intermediate the wheels, over-axle straps connecting the truck levers associated with each wheel and axle assembly, power means supported from said bottom frame member intermediate the wheels, and an operative connection between each live truck lever and the adjacent end of said power means.

13. In a brake arrangement for a railway car truck, a side frame having spaced wheel connecting means, supporting wheel and axle assemblies, brackets on the extremities of said frame below the axle level, power means mounted on said side frame, and brake rigging comprising dead levers fulcrumed at their lower ends from said brackets, hangers supporting live truck levers intermediate the wheels, straps connecting the live and dead levers at each end of the truck, and operative connections between said power means and said live truck levers, said operative connections comprising transversely arranged levers fulcrumed in said frame at opposite sides of said power means and connected at their inner ends to said live levers respectively.

14. In a brake arrangement for a railway car truck, a side frame having spaced wheel connecting means, supporting wheel and axle assemblies, brackets on the extremities of said frame below the axle level, power means mounted on said side frame, and brake rigging comprising dead levers fulcrumed at their lower ends from said brackets, hangers supporting live truck levers intermediate the wheels, straps connecting the live and dead levers at each end of the truck, and operative connections between said power means and said live truck levers, said operative connections comprising live and dead cylinder levers connected at opposite ends of said power means and connected at corresponding ends to transversely arranged truck levers.

15. In a brake arrangement for a railway car truck, a side frame having spaced wheel connecting means, supporting wheel and axle assemblies, brackets on the extremities of said frame below the axle level, power means mounted on said side frame, and brake rigging comprising dead levers fulcrumed at their lower ends from said brackets, hangers supporting live truck levers intermediate the wheels, straps connecting the live and dead levers at each end of the truck, and operative connections between said power means and said live truck levers, said operative connections comprising dead truck levers fulcrumed in said frame and connected at their inner ends to said live truck levers respectively 16. In a railway car truck, a side frame having wheel connecting means, spaced supporting wheel and axle assemblies, power means mounted on said side frame centrally thereof, and brake rigging comprising dead truck levers fulcrumed at their lower ends from the extremities of said frame, live truck levers supported from said frame intermediate the wheels, straps connecting the upper ends of the live and dead truck levers associated with each wheel, truck levers fulcrumed in said frame intermediate the wheels, and interconnected live and dead cylinder levers connected at corresponding ends to said power means and connected at their other ends respectively to said last-mentioned truck levers.

17. In a brake arrangement for a railway car truck, a side frame, spaced supporting wheel and axle assemblies, power means mounted on said frame, dead truck levers fulcrumed at their lower ends from the extremities of said frame, hangers supporting live truck levers intermediate the wheels, straps connecting the live and dead truck levers associated with each wheel, diagonal truck levers fulcrumed in said frame and connected at their inner ends to said live truck levers respectively, and live and dead cylinder levers connected at opposite ends of said power means, connected intermediate their ends to each other, and connected at corresponding ends to said diagonal truck levers respectively.

18. In a railway car truck, a side frame having wheel connecting means, spaced supporting wheel and axle assemblies, power means mounted on said side frame centrally thereof, and brake rigging comprising dead truck levers fulcrumed at their lower ends from the extremities of said frame, live truck levers supported from said frame intermediate the wheels, straps connecting the upper ends of the live and dead truck levers associated with each wheel, and truck levers fulcrumed in said frame intermediate the wheels and operatively connected between opposite ends of said power means and said live truck levers respectively.

19. In a brake arrangement for a railway car truck, a side frame having spaced wheel connecting means, supporting wheel and axle assemblies, brackets on the extremities of said frame below the axle level, power means mounted on said side frame, and brake rigging comprising dead levers fulcrumed at their lower ends from said brackets, live truck levers supported intermediate the wheels, straps connecting the live and dead levers at each end of the truck, and operative connections between said power means and said live truck levers.

20. In a railway car truck, a side frame having wheel connecting means, spaced supporting wheel and axle assemblies, power means mounted on said side frame centrally thereof, and brake rigging comprising dead truck levers fulcrumed at their lower ends from the extremities of said frame, live truck levers supported from said frame intermediate the wheels, straps connecting the upper ends of the live and dead truck levers associated with each wheel, and operative connections between said power means and the lower ends of said live truck levers.

21. In a railway car truck, a composite side frame comprising a bottom member having wheel connecting means and a top member resiliently supported thereon, spaced supporting wheel and axle assemblies, brake rigging comprising live and dead truck levers at opposite sides of each assembly and respectively supported from and fulcrumed from said bottom member, and power means operatively connected with the lower ends of said live truck levers, said power means comprising a cylinder, interconnected live and dead cylinder levers connected to opposite ends thereof, and an operative connection between each cylinder lever and the adjacent live truck lever.

22. In a railway car truck, a composite side frame comprising a bottom member having wheel connecting means and a top member resiliently supported thereon, spaced supporting wheel and axle assemblies, brake rigging comprising live truck levers supported from said bottom member and dead truck levers fulcrumed from said bottom member, and power means supported from said bottom member and operatively connected with the lower ends of said live truck levers, said power means comprising a cylinder, interconnected live and dead cylinder levers connected to opposite ends thereof, and an operative connection between each cylinder lever and the adjacent live truck lever.

23. In a railway car truck, a composite side frame comprising a bottom member having wheel connecting means and a top member resiliently supported thereon, spaced supporting wheel and axle assemblies, brake rigging comprising live and dead truck levers supported at opposite sides of each assembly, said dead truck levers being fulcrumed from said bottom member, and power means operatively connected with the lower ends of said live truck levers, said power means comprising a cylinder, interconnected live and dead cylinder levers connected to opposite ends thereof, and an operative connection between each cylinder lever and the adjacent live truck lever.

24. In a railway car truck, a composite side frame comprising a bottom member having wheel connecting means and a top member resiliently supported thereon, spaced supporting wheel and axle assemblies, brake rigging comprising live and dead truck levers supported at opposite sides of each assembly, a connection between the top of each live lever and the associated dead lever, and power means supported from said bottom member and operatively connected with the lower ends of said live truck levers.

25. In a railway car truck, a side frame having wheel connecting means, spaced supporting wheel and axle assemblies, power means mounted on said frame, brake rigging comprising live and dead truck levers supported at opposite sides of each assembly, said dead truck levers being fulcrumed at their lower ends from said frame, a connection between the live and dead truck levers associated with each assembly, and operative connections between said power means and said live levers.

26. In a railway car truck, a side frame comprising wheel connecting means, spaced supporting wheel and axle assemblies, brake rigging comprising interconnected live and dead truck levers associated with each of said assemblies, said dead lever being fulcrumed at its lower end from said frame, and power means supported from said frame and associated with said live lever.

27. In a brake arrangement, a wheel and axle assembly and brake means therefor comprising live and dead truck levers interconnected at the upper ends thereof, and power means operatively connected to the lower end of the live lever.

28. In a brake arrangement, a vehicle frame, a supporting wheel and axle assembly and brake rigging therefor comprising live and dead truck levers at opposite sides of said assembly, means connecting the tops of said levers, and power means operatively connected to the live lever.

29. In a brake arrangement, a vehicle frame, a supporting wheel and axle assembly and brake rigging therefor comprising a dead lever fulcrumed at its lower end from the frame, a live lever connected to said dead lever, and power means operatively connected to the lower end of said live lever.

30. In a brake arrangement, a vehicle frame, a supporting wheel and axle assembly and brake rigging therefor comprising a dead lever fulcrumed at its lower end from the frame, a live lever connected to the dead lever, and power means operatively connected to the live lever.

31. In an equalizer for a railway car truck comprising spaced wheel and axle assemblies, a member having intermediate the ends thereof portions adapted to seat upon the journal boxes of respective assemblies, brake hanger brackets at the ends of said member disposed beneath the axle level of said assemblies, and a vertical bracket formed on said member intermediate said portions, said bracket being formed and arranged to afford support for an associated brake actuating device.

32. In an equalizer for a railway car truck, a member having adjacent each end thereof a portion adapted to seat upon an associated journal box, seats on said member intermediate the ends thereof for associated frame supporting springs, a brake hanger bracket on each extremity of said member and disposed beneath the level of said seats, and a brake cylinder support bracket on said member approximately midway between the ends thereof.

33. An equalizer for a railway car truck having adjacent each end thereof a portion adapted to embrace the journal box of an associated wheel and axle assembly, an inturned brake hanger bracket on each extremity of said equalizer beneath the axle level of said assembly, and an upstanding brake cylinder support bracket formed on said equalizer approximately midway between the ends thereof.

34. In combination, an equalizer for a railway car truck, spaced supporting wheel and axle assemblies, a brake hanger bracket on each end of said equalizer outwardly of the adjacent assembly and beneath the axle level, and a vertical bracket projecting upwardly from said equalizer approximately midway between the ends thereof, said bracket having at its upper end support means for an associated brake actuating device.

CARL E. TACK.